United States Patent
McLarty et al.

(10) Patent No.: US 7,876,287 B2
(45) Date of Patent: *Jan. 25, 2011

(54) MINI MONITOR ON SHARED PERIPHERAL BUS

(75) Inventors: Hugh J. McLarty, Vashon, WA (US);
Guy Tiphane, Atherton, CA (US);
David Wegmuller, Union City, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 1007 days.

This patent is subject to a terminal disclaimer.

(21) Appl. No.: 11/404,508

(22) Filed: Apr. 13, 2006

(65) Prior Publication Data
US 2006/0256034 A1  Nov. 16, 2006

Related U.S. Application Data

(63) Continuation of application No. 09/640,168, filed on Aug. 15, 2000, now Pat. No. 7,034,777.

(51) Int. Cl.
*G09G 5/00* (2006.01)
*G06F 13/00* (2006.01)
*G09G 5/36* (2006.01)

(52) U.S. Cl. .................. 345/2.2; 345/1.1; 345/537; 345/547

(58) Field of Classification Search ........... 345/1.1–3.1, 345/530–573
See application file for complete search history.

(56) References Cited

U.S. PATENT DOCUMENTS

| 4,646,261 | A |   | 2/1987  | Ng |
|-----------|---|---|---------|----|
| 4,954,979 | A |   | 9/1990  | Eibner et al. |
| 5,010,413 | A |   | 4/1991  | Bahr |
| 5,032,083 | A |   | 7/1991  | Friedman |
| 5,043,919 | A |   | 8/1991  | Callaway et al. |
| 5,107,443 | A |   | 4/1992  | Smith et al. |
| 5,255,361 | A |   | 10/1993 | Callaway et al. |
| 5,467,102 | A |   | 11/1995 | Kuno et al. |
| 5,682,486 | A | * | 10/1997 | Grossman et al. ........... 715/788 |
| 5,790,176 | A | * | 8/1998  | Craig ......................... 725/115 |

(Continued)

FOREIGN PATENT DOCUMENTS

JP   2190926   7/1990

(Continued)

OTHER PUBLICATIONS

"Cutting Edge Technology, etc.", http://www.e-g-i.com/et00032.htm--Jun. 21, 2000.

(Continued)

*Primary Examiner*—Srilakshmi K Kumar
(74) *Attorney, Agent, or Firm*—Townsend and Townsend and Crew LLP

(57) ABSTRACT

A system with a main monitor for a host computer and a second, mini monitor for displaying a portion of the display normally intended for the main monitor. In one embodiment, the mini monitor is connected to the computer over a shared, peripheral bus, such as the universal serial bus (USB). The smaller size of the mini monitor and either compression or slower refresh rates allow it to be connected to the USB just like other peripheral devices.

21 Claims, 2 Drawing Sheets

U.S. PATENT DOCUMENTS

| | | | |
|---|---|---|---|
| 5,796,577 | A | 8/1998 | Ouchi et al. |
| 5,805,118 | A | 9/1998 | Mishra et al. |
| 5,874,928 | A | 2/1999 | Kou |
| 5,959,686 | A | 9/1999 | Jeong |
| 6,011,498 | A | 1/2000 | Wittig |
| 6,018,340 | A | 1/2000 | Butler et al. |
| 6,025,871 | A | 2/2000 | Kantor et al. |
| 6,144,363 | A | 11/2000 | Alloul et al. |
| 6,191,758 | B1 * | 2/2001 | Lee ............................ 345/2.2 |
| 6,333,750 | B1 | 12/2001 | Odryna et al. |
| 6,509,911 | B1 * | 1/2003 | Shimotono ................. 715/761 |
| 6,522,309 | B1 | 2/2003 | Weber |
| 7,034,777 | B1 * | 4/2006 | McLarty et al. .............. 345/2.2 |

FOREIGN PATENT DOCUMENTS

| | | |
|---|---|---|
| JP | 7178078 | 7/1995 |

OTHER PUBLICATIONS

"Eternal Graphics", http://www.e-g-i.com/--Jun. 26, 2000.
"Dual Monitors", Windows 98 dual monitor mode:, http://www.computouch.ca/proj.sub.--dual.sub.--monitor.htm.

* cited by examiner

MINI MONITOR ON SHARED PERIPHERAL BUS

BACKGROUND OF THE INVENTION

The present invention relates to a second monitor for a computer system, and in particular a miniature monitor for showing a portion of the display of the larger monitor.

There are a number of systems which use multiple monitors. A number of companies produce multiple monitor systems which have a stand with two, three, or four flat panel displays mounted on them. Graphics cards have been developed to support multiple monitors. Typically, multiple parallel ports are used to used to connect to each of the monitors from the mother board or graphics card.

The Microsoft Windows 98™ software contains a dual monitor mode for allowing the driving of two separate images. For example, a Toshiba satellite XGA notebook can drive an internal and external display at the same time, one on a notebook's monitor and the other on a separate monitor, such as the user's desktop monitor. A number of software applications allows splitting of portions of the display between the two monitors. For example, Powerpoint 2000™ allows a screen show on one monitor and editing of the same show on another monitor. Outlook Express™ allows a list of e-mail messages on one monitor, and individual messages on the other. Other applications allow help screens and error messages to be displayed on a different monitor. See U.S. Pat. No. 6,018,340 for a description of the 'virtual desktop' that is implemented in Windows 98, in which the so-called desktop is extended across multiple monitors.

U.S. Pat. No. 5,682,486, issued to IBM, shows a system for the movement of windows, icons, etc. between multiple monitors using a "transport" region into which they are moved on a particular monitor.

U.S. Pat. No. 5,255,361, JP2190926A2, U.S. Pat. No. 5,043,919 et. al., (IBM), describe the technique of modeling a current-display and desired-display in computer memory, comparing them to determine differences, and sending update commands.

U.S. Pat. No. 4,646,261 describes a means for detecting changes to video memory and sending only the updated video information to the display. U.S. Pat. No. 5,959,686 describes a system with a primary monitor and a plurality of sub monitors, with a kind of serial daisy-chain for controlling the sub-monitors. The sub monitors receive the same video signal as the main monitor.

SUMMARY OF THE INVENTION

The present invention provides a system with a main monitor for a host computer and a second, mini monitor for displaying a portion of the display normally intended for the main monitor. In one embodiment, the mini monitor is connected to the computer over a shared, peripheral bus, such as the universal serial bus (USB). The smaller size of the mini monitor and either compression or slower refresh rates allow it to be connected to the USB just like other peripheral devices.

By displaying on the second, mini monitor windows which do not update often, the amount of bandwidth required is further reduced. For example, the smaller monitor could be used for a stock chart or tickertape, e-mail alert, a calendar, appointment book, alarm clock, etc.

In one embodiment, the existing dual monitor feature of Windows 98 is used. A custom video driver makes the device appear to be an ordinary video card and computer monitor to the Windows operating system and to application software. The mini monitor itself will include the USB interface and a video memory for storing the current screen locally, so that refreshing need not be done over the USB. A simple display controller for driving the display from the video memory is provided. The more complex video controller operations, such as updating the memory, doing rendering, etc. is done in the host computer microprocessor or video graphics processor.

In another embodiment, the mini-monitor has touch screen capability, allowing it to also function as a control pad where icons from toolbars, etc. are off the main screen. Other interaction buttons, such as "Select", "Next", and "Back" are included. These buttons can be used for content provided to the mini-monitor over the internet, such as pictures from a museum, stock reports, etc.

For a further understanding of the nature and advantages of the invention, reference should be made to the following description taken in conjunction with the accompanying drawings.

DESCRIPTION OF THE SPECIFIC EMBODIMENTS

Figure 1:
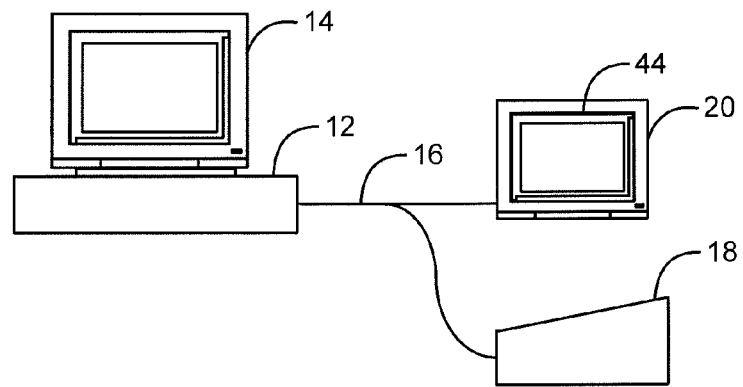
FIG. 1 is a diagram illustrating a system with a peripheral monitor according to the invention.

FIG. 1 illustrates a computer 12 having a main monitor 14. A USB 16 connects to a number of peripherals, such as a scanner 18. Another device connected to the USB according to an embodiment of the invention is a mini monitor 20.

Figure 2:
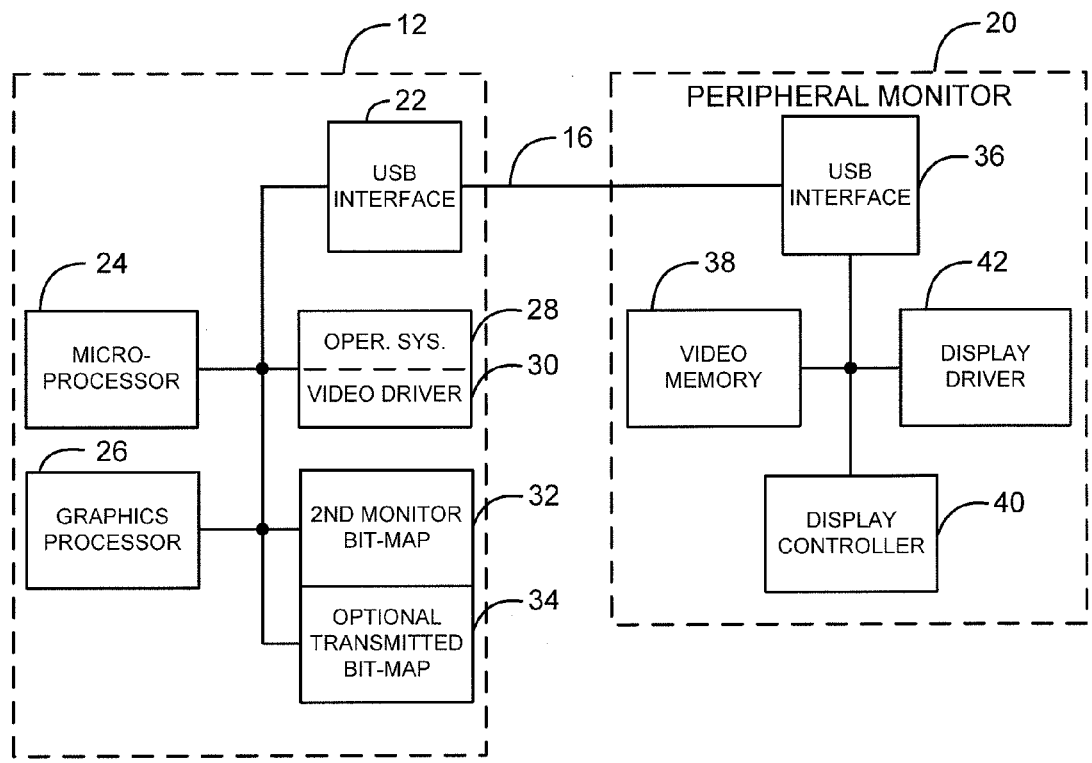
FIG. 2 is a block diagram illustrating the major elements of the computer and peripheral monitor pertinent to an embodiment of the invention.

FIG. 2 is a block diagram illustrating the main components of computer 12 relevant to controlling the mini monitor, and the mini monitor or peripheral monitor 20. Computer 12 communicates over the USB using a USB interface 22. The sending of video data can be controlled either by a microprocessor 24, or a special graphics processor or graphics accelerator board 26. The microprocessor or graphics processor operate under control of the operating system 28 as stored in memory. A custom video driver 30 modifies the operating system operation as necessary to provide for the transmission of display data to the peripheral monitor.

A bitmap memory or frame buffer 32 stores the image which is provided to the peripheral monitor. This can either be a separate area of memory, or a designated portion of the frame buffer for the main display 14. In one embodiment, an optional transmitted bitmap memory 34 stores the last video data transmitted to the peripheral monitor. Thus, bitmap 32 will be updated with current desired display information, and could be compared to what has been previously transmitted in bitmap memory 34. This comparison can be used to determine what portions of the display need to be transmitted to peripheral monitor 20 for updating.

Peripheral monitor 20 contains its own USB interface 36. The video data received is stored in a local video memory 38. A display controller 40 refreshes the display with the data in video memory 38. Display controller 40 can be a simple controller that merely reads video memory 30 and provides the appropriate pixel information to the display. Optionally, this can be under the control of a software display driver in memory in the peripheral monitor, such as a display driver 42.

In one embodiment, the screen 44 of monitor 20 (see FIG. 1) has a dimension of approximately 3"×5". The actual dimensions can vary, with the only limitation being the amount of bandwidth on bus 16. Since there is a tradeoff between the size of the screen and how often the data can be updated, different size screens can be supported depending upon the application.

Video driver 30 will maintain bitmap 32, which contains the desired display image. When graphical commands are issued from the OS or an application, these commands are applied to this bitmap, commonly known as an 'off-screen bitmap". This allows, for example, quick retrieval of the value of any pixels without having to retrieve values via USB from the external device, which would slow the process and complicate the device. The video driver can keep track of which pixels, or which areas or regions of the off-screen bitmap, have been modified by graphical commands, and which parts of the off-screen bitmap have already been transmitted to the external device, and the driver can arrange to transmit just those areas that need to be sent over the USB connection to the external device. In addition, the driver can attempt to compress the transmitted data, using any number of well-known bitmap data compression techniques, such as run-length encoding (RLE). Alternately, a motion compression technique such as MPEG can be used. There is enough compute power on the host PC to attempt several different compression techniques, choosing the one that gives the best results for a given block of pixels. If the video driver maintains a second bitmap that models the current state of the mini monitor (current as opposed to desired), then the driver can examine and compare the two bitmaps to help it transmit data efficiently. For example, the processor can detect that the main change in an area is a color change, which could be transmitted very efficiently as a command of the form: "In rectangle change all pixels having color A to color B".

There are also many algorithms that could be applied creatively to this problem (of rapidly updating the image on the mini monitor). For example, if the entire display changes all at once, the system could transmit a half resolution image (which takes a quarter of the data), followed by the additional data to bring it up to full resolution. If the mini-monitor is being repeatedly updated, this would have the effect of adaptively dropping the resolution in order to maintain the update rate. The computer can also identify when the mouse cursor is moving over the mini monitor, and make updating the area under and near the cursor as a first priority.

In one embodiment, the driver doesn't just send every pixel as it changes. Instead, it constantly collects blocks of data to be sent, placing them in a queue which is emptied by a concurrent process that takes these queued blocks and sends them over the USB. As an optimization, if a block is queued that covers rectangle R, it would be reasonable to check that no earlier queued block is covered by R. In that case, the older block would be discarded without being sent, as its contents are obsolete.

Very few applications of this mini monitor require high-speed update of the entire display area, so doing compressed updates of only the areas that change should provide excellent speed-up, on the order of 5× to 10×.

The software aspects of this device extend beyond the use of a smart video driver. Existing software technology allows tracking which applications are running, and detecting when a new application is launched or shut down. For example, Logitech's Wingman™ products use this technology to adapt game controllers to whatever game the user runs, without user intervention. This technology can be applied to the mini monitor. The user can designate one or more applications whose windows should always appear on the mini monitor, and the software will detect when one of these applications is about to display a window, relocating the window instantly to the mini monitor. This technique can be extended to specific classes of windows, such as "error message windows from inside Microsoft Developer Studio", or "Connecting to Internet" windows, and so on. There are many patterns that can be used to identify candidate windows to be redirected to the mini monitor, including the name of the parent application, the title of the window, key words in the text of the window, etc. The software can also monitor which windows the user drags into (and off) the mini monitor, and "learn" the appropriate set of windows to relocate automatically.

Figure 3:
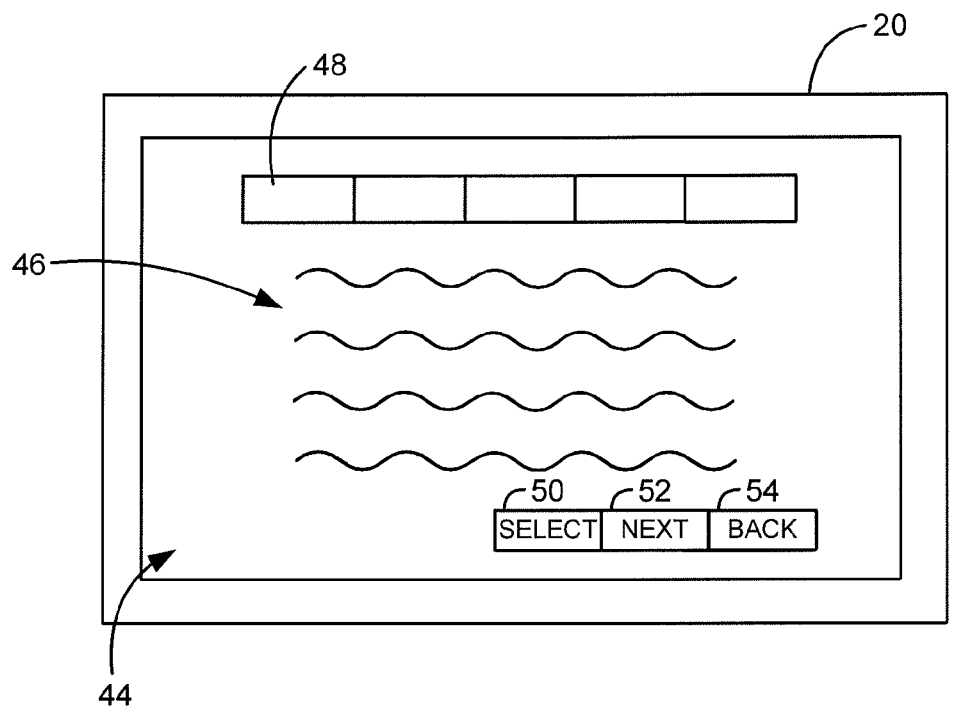
FIG. 3 is a diagram of one embodiment of a mini-monitor screen illustrating touch-screen buttons.

FIG. 3 illustrates one embodiment of a mini-monitor 20 with a touch screen. Display 44 includes a display area 46. At the top is a tool bar 48. In one embodiment, the tool bar containing certain icons from a tool bar on a window displayed on the main monitor. The mini-monitor could only have the tool bar, or could have part of the window display as well. The mini-monitor could function as a control pad for the main screen. This frees up main screen space for the primary view of an application (such as the contents of a document being edited or the main view of a game). The mini-monitor can also be used to provide an additional mode of icon/command selection. The mini-monitor, in response to touching of the buttons, will send a signal back over the bus to the host computer which mimics a mouse signal. Alternately, the mouse icon could be moved over to the mini-monitor for selection.

FIG. 3 also illustrates a "Select" button 50, a "Next" button 52 and a "Back" button 54. One use for these is where a supplier offers a subscription to deliver content through the internet directly to the mini-monitor, without having the user consider this as a second monitor for regular windows. For examples, subscribed pictures from a museum could be downloaded and displayed, making the mini-monitor a picture from. The buttons could be used to go back and forth between pictures. The Select button can cause the computer to open a web site pertaining to that picture (e.g., so the user can buy it). Other services could include announcing an IPO or a drop in stock price of a monitored stock. The user could press Select to open the web site to access more news and options. In one embodiment, the delivery of contents to the mini-monitor is wireless, as is the button interaction with the computer. Other combinations are possible, such as using the bus to deliver the screen display to the monitor, but using a wireless connection for the button input to the computer.

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. A monitor system comprising:
   a host computer;
   a first monitor connected to said host computer;
   a second monitor, separate and unattached to said first monitor, smaller than said first monitor, and coupled to said host computer via a shared peripheral bus interface; and
   a video driver in said host computer configured to: i) provide a portion of a display on said first monitor to said second monitor, ii) determine whether a stored image is different from an image currently displayed on the second display, iii) transmit a lower than full resolution image of the stored image to the second monitor for display if the stored image is different from the image currently displayed on the second monitor, and iv) thereafter transmit additional image data to the second monitor to bring the image displayed on the second monitor to full resolution.

2. The system of claim 1, wherein said shared peripheral bus interface is a universal serial bus (USB) interface, and wherein a peripheral device other than said second monitor is coupled to said host computer via said shared peripheral bus interface.

3. The system of claim 2, wherein said second monitor is powered via said shared peripheral bus.

4. The system of claim 1, wherein said portion of a display comprises a separate window from said first monitor.

5. The system of claim 1, wherein said portion of a display is provided only to said second monitor.

6. The system of claim 1, further comprising a compression unit for compressing said portion of said display for transmission to said second monitor.

7. The system of claim 1, further comprising a software operating system controlling said first computer, said operating system controlling the transmission of video data to said second monitor.

8. The system of claim 1, wherein said second monitor includes: a display screen; a display controller coupled to said display screen; a video memory coupled to said display controller; and a second shared peripheral bus interface coupled to said video memory.

9. The system of claim 1, wherein a display screen on said second monitor is less than 8.5 inches diagonally.

10. The system of claim 1, wherein said second monitor includes a touch screen.

11. The system of claim 1, wherein said second monitor includes a transmission capability for providing data to said computer on the activation of buttons.

12. The system of claim 1, wherein said transmission capability is wireless.

13. The system of claim 1, wherein the second monitor is configured to function as a control pad for the first monitor.

14. A monitor system comprising:
a host computer;
a first monitor connected to said host computer;
a second monitor, separate and unattached to said first monitor, smaller than said first monitor, and coupled to said host computer via a shared peripheral bus interface; and
a video driver in said host computer configured to: i) collect a plurality of changed video sets, ii) order each set of changed video in a queue, iii) discard from the queue each earlier set of changed video that is configured for display on the same portion of the second monitor as a subsequent set of changed video, and vi) thereafter transfers the sets of changed video in the queue to the second monitor for display.

15. The system of claim 14, wherein said shared peripheral bus interface is a universal serial bus (USB) interface, and wherein a peripheral device other than said second monitor is coupled to said host computer via said shared peripheral bus interface.

16. The system of claim 15, wherein said second monitor is powered via said shared peripheral bus.

17. The system of claim 14, wherein said portion of a display comprises a separate window from said first monitor.

18. The system of claim 14, wherein said portion of a display is provided only to said second monitor.

19. The system of claim 14, further comprising a compression unit for compressing said portion of said display for transmission to said second monitor.

20. The system of claim 14, further comprising a software operating system controlling said first computer, said operating system controlling the transmission of video data to said second monitor.

21. The system of claim 14, wherein said second monitor includes icons for control of a display on said first monitor.

* * * * *